Sept. 5, 1933. J. W. TATTER 1,925,680
BRAKE MECHANISM
Filed Aug. 26, 1929  2 Sheets-Sheet 1
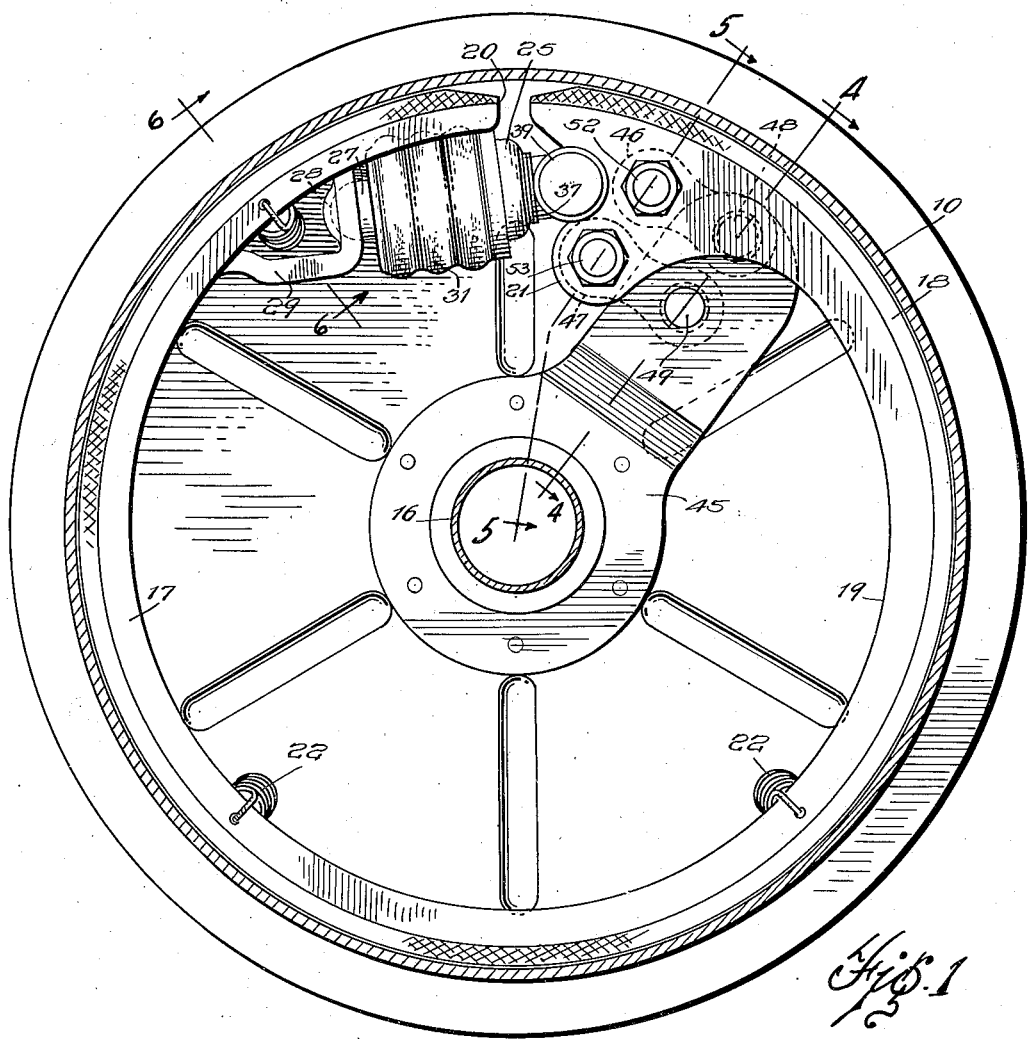
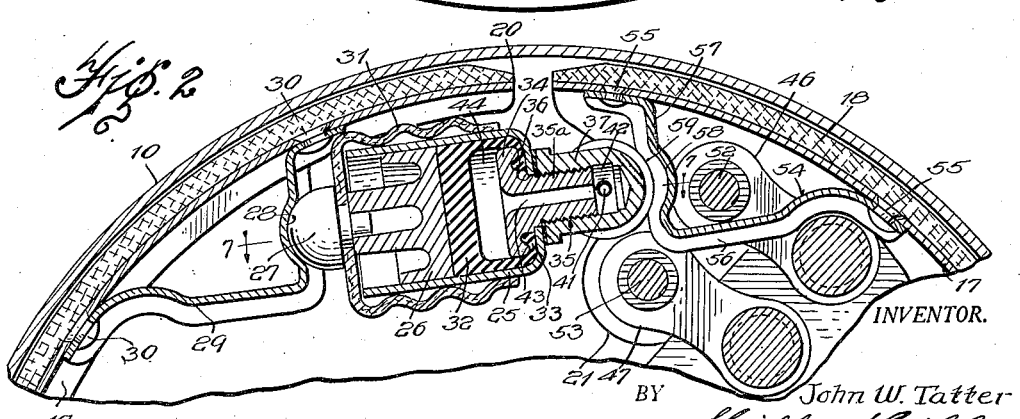
INVENTOR.
John W. Tatter
BY Hill & Hill
ATTORNEYS

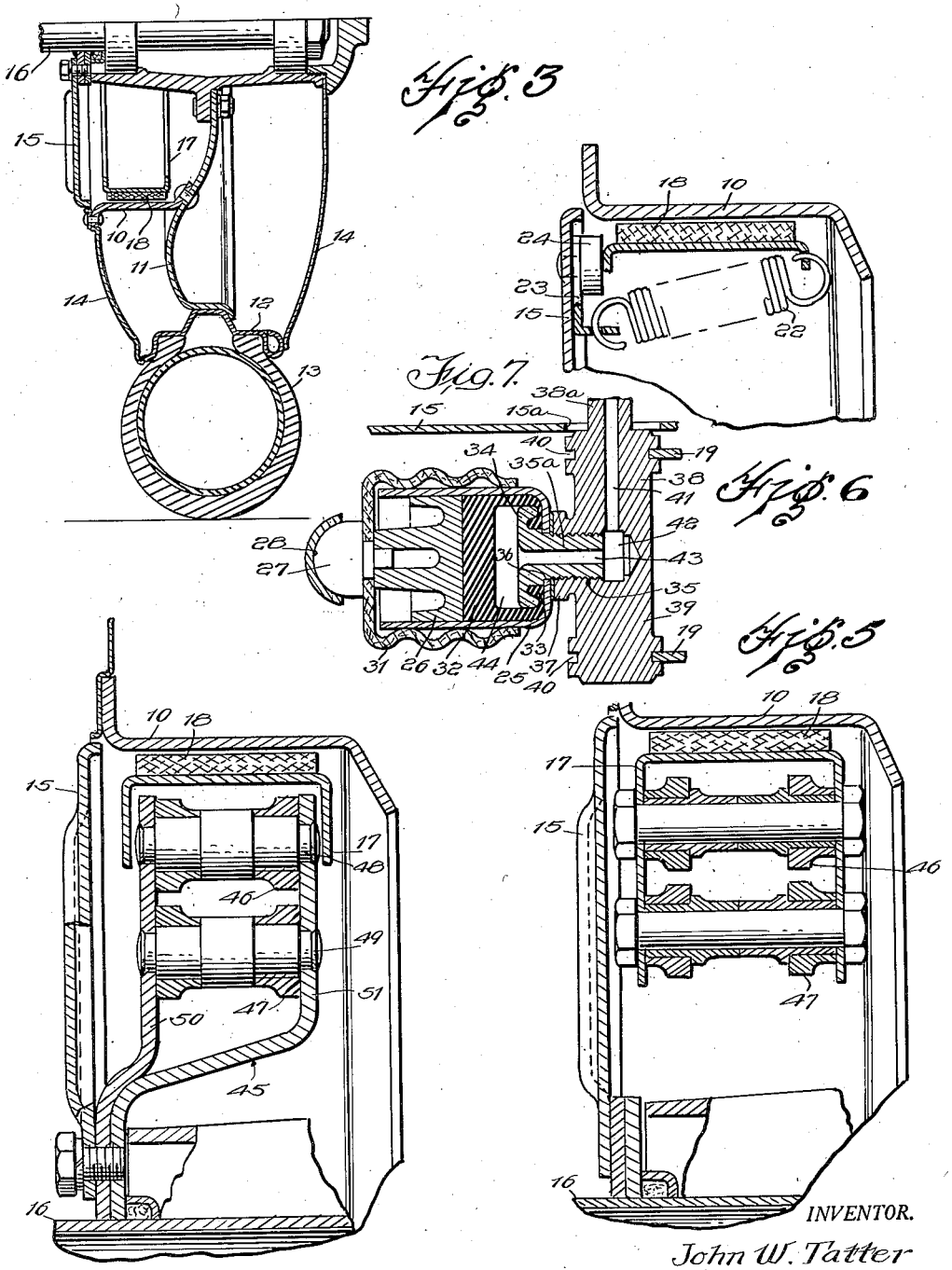

Patented Sept. 5, 1933

1,925,680

UNITED STATES PATENT OFFICE 1,925,680

BRAKE MECHANISM

John W. Tatter, Chicago, Ill., assignor to Lewis Differential Company, Chicago, Ill., a corporation of Illinois Application August 26, 1929. Serial No. 388,585

9 Claims. (Cl. 188—78)

This invention relates to brake mechanism, and is particularly adapted to be embodied in brake mechanism of the internal expanding type.

One object of the present invention is to provide an improved brake mechanism constructed and arranged in such a manner that the friction material associated therewith will engage the brake drum so that the braking effect is applied smoothly and effectively without subjecting any particular portion of material to more wear than any other portion thereof.

Another object of the invention is to provide a brake shoe constructed and supported in such a manner that substantially the entire outer surface of the friction lining of the shoe will uniformly engage the brake drum when the brakes are applied.

Another object of the invention is to provide a construction and arrangement of the brake supporting and operating means wherein the ends and body portion of the brake shoe and lining are held in substantial alignment.

Another object of the invention is to provide novel means for anchoring one end of the brake shoe in a manner to retain the substantially circular formation of the shoe and lining when the brake is expanded, and provide substantially uniform contact of the lining with the brake drum.

A further object of the invention is to provide a device of the character described which is simple, compact, convenient, durable and efficient in its operation.

A still further object of the present invention is to improve devices of the character disclosed in sundry details hereinafter described and particularly pointed out in the appended claims.

One embodiment of the present invention is shown for illustrative purposes in the accompanying drawings in which Fig. 1 is a side elevation of a brake mechanism embodying features of my invention.

Fig. 2 is a fragmentary sectional elevation of the structure illustrated in Fig. 1.

Fig. 3 is a fragmentary sectional elevation through a portion of a wheel illustrating the application thereto of an internal expanding brake.

Fig. 4 is a transverse sectional view taken substantially as indicated by the line 4—4 of Fig. 1.

Fig. 5 is a transverse sectional view taken substantially as indicated by the line 5—5 of Fig. 1.

Fig. 6 is a fragmentary sectional view taken substantially as indicated by the line 6—6 of Fig. 1.

Fig. 7 is a sectional plan view taken substantially as indicated by the line 7—7 of Fig. 2.

The illustrative embodiment of the invention is shown in the drawings as applied to a brake structure of the internal expanding type adapted to cooperate with the inner surface of a brake drum 10, shown in Fig. 3 as incorporated in a wheel structure having a disc 11 for supporting the rim 12, on which the tire 13 is mounted, and provided with cover plates 14 and a stationary dust plate 15, the latter being suitably mounted on a relatively stationary axle or axle housing 16 in a manner to protect the brake chamber within the drum from dust and the like which might seriously interfere with the efficient operation of the brake mechanism.

Suitably positioned within the drum 10 is a brake shoe 17 of substantially annular form, and provided on its outer surface with a suitable lining of friction material 18 adapted to engage the inner surface of the drum 10 when the shoe is expanded by the operation of the brake mechanism.

The shoe 17 in the present structure is provided preferably with a plurality of flanges 19 shown in the present instance as positioned at opposite sides of the shoe in a manner to form a shoe of substantially U-shaped cross section. The flanges in the present instance are of varying dimension radially being shown in the drawings (Fig. 1) as increasing in width from one end portion of the shoe indicated at 20 in Fig. 1 toward the opposite end portion thereof, and terminating adjacent said last mentioned end portion in a flange of substantial width as indicated at 21 in Fig. 1.

Referring particularly to Figs. 1 and 6, it will be noted that the shoe 17 is provided at intervals throughout its length with tension springs 22 having one of their end portions connected with the outermost flange 19, and their opposite ends connected with brackets 23, one of which is shown in Fig. 6 secured to the dust plate 15 for holding the innermost flange or inner edge of the shoe 17 yieldingly against a plurality of spacing blocks 24, one of which is shown in Fig. 6, in a manner to properly position the brake shoe laterally within, and with respect to the drum 10.

Suitable brake expanding means operatively related to the end portions of the brake shoe are provided and shown in the present instance for illustrative purposes as of the hydraulic pressure type in which the cylinder 25 is provided with a piston 26 mounted therein in a manner to be relatively movable with respect thereto, the piston having a ball like member 27 operatively related thereto and adapted to engage a cup like socket portion 28 formed in a bracket 29 formed preferably of U-shaped channel-iron bent to suitable form and secured to one end portion of the brake shoe 17, preferably the end portion indicated at 20, by means of rivets 30. The cylinder 25 is also provided with a cup like flexible dust cover 31 positioned preferably between a portion of the piston 26 and member 27, and adapted to surround and snugly engage the outer surface of the cylinder in a manner to exclude dust and grit from entering the interior thereof and interfering with the efficient operation of the piston.

Suitably positioned between the end of the piston 26 and head of the cylinder 25 is a sealing cup 32 formed preferably of suitable resilient flexible material, and having an inwardly extending annular flange portion 33 adapted to be engaged by an outwardly extending annular rim or flange 34 formed on a sealing cup retaining stud 35 having a screw-threaded shank portion 35a extending outwardly through an aperture 36 formed in the head of the cylinder 25. The threaded shank portion 35a of the retaining stud 35 is adapted to receive thereon a hollow cylinder-head nut 37 cooperable with the head of the cylinder 25 in a manner to draw the flange 34 of the retaining stud 35 against the inwardly extending flange 33 of the sealing cup 32 in a manner to snugly clamp the flange 33 between the flange 34 of the stud and the head of the cylinder 25.

Referring particularly to Fig. 7 of the drawings, it will be noted that the cylinder-head nut 37 is provided with laterally extending portions 38 and 39 having annular grooves 40 formed therein adjacent the outer ends thereof and adapted to receive the edge portion of the flanges 19 of the brake shoe 17 preferably where the flanges attain a substantial width as indicated at 21 in Figs. 1 and 2. The laterally extending portion 38 of the cylinder head nut 37 has a reduced portion 38a adapted to extend through an aperture 15a formed in the dust plate 15 and is provided with a port 41 communicating at one of its ends with a chamber 42 formed in the nut 37 and at its opposite end with a suitable source of fluid pressure supply (not shown), whereby pressure is admitted to the chamber 42 and thence through a port 43 formed in the cup retaining stud 35 to a chamber 44 within the sealing cup 32 for expanding the cup longitudinally of the cylinder 25 in a manner to relatively move the ball like member 27 and laterally extending portions 38 and 39, in opposite directions, and by reason of their connections with the ends of the brake shoe, to expand the shoe and force the lining 18 into engagement with the inner surface of the brake drum 10.

It will be noted from the foregoing description that the brake operating means is provided with a three point suspension operatively related to the end portions of the brake shoe 17, the points of suspension or contact being so arranged as to form the apices of a triangle, and positioned with respect to the end portions of the shoe in a manner to resist lateral relative displacement of the ends of the brake shoe and retain the body and end portions thereof in substantial alignment.

The outer surface of the brake shoe 17 and friction material 18 secured thereto are normally of substantially circular form, and to provide for expanding the shoe and lining uniformly in a manner to exert substantially equal pressure on the inner surface of the drum 10 throughout substantially the entire length or circumferential dimension of the shoe and material 18, one end portion of the shoe is operatively connected by means of radially spaced links 46 and 47 to a relatively stationary anchor 45 suitably carried by and secured to the axle or housing 16 on which the dust plate 15 is mounted. The links 46 and 47 are preferably of substantially equal length, arranged in pairs (see Figs. 4 and 5), and are pivotally mounted at one of their end portions on rods 48 and 49, respectively, supported in arms 50 and 51 of the anchor 45, and at their opposite end portions pivotally connected to rods 52 and 53, respectively, supported in the relatively wide portions indicated at 21 of the flanges 19 formed on the brake shoe 17.

In the present structure, the links 46 and 47 combined, are four in number and are shown as spaced radially from the center of the drum 10, and arranged in pairs, the links of each pair being laterally spaced and positioned between the flanges 19 of the shoe, and between the arms 50 and 51 of the anchor 45.

It will be noted from the foregoing description that with the links 46 and 47 arranged in the manner shown and described, that when pressure is admitted to the interior of the sealing cup 32, the ends of the shoe will be forced apart in a manner to bring the lining into engagement with the inner surface of the drum, and that by reason of the parallelogram arrangement of the radially spaced pairs of links 46 and 47, any canting or tilting of the adjacent end of the shoe inwardly will be prevented and the shoe expanded substantially uniformly throughout its length, the varying width of the flanges 19 contributing materially to the uniform expansion of the shoe.

In the event that the present invention is to be used in conjunction with brake shoes of extremely wide dimensions, the portions 38 and 39 of the head bolt 37 may be adapted to cooperate with a bracket, such as that indicated by the reference character 54 in Fig. 2 of the drawings, and which, if desired, may be secured to the brake shoe 17 by means of rivets 55 or the like between the flanges 19 of the brake shoe. The bracket 54 is preferably of substantially U-shaped cross section having flanges 56 formed at the sides thereof, and the vertically disposed portion 57 of the bracket is bent to form a recess 58 to provide clearance for the cylinder head nut 37, and the flanges 56 forming a part of the portion 57 are bent along their edges as indicated at 59 in a manner to conform substantially to the curvature in the bottom of the grooves 40 of the portions 38 and 39 of the cylinder head nut, and provide a seat for retaining the portions 38 and 39 against displacement longitudinally of the vertically disposed portion 57 of the bracket 54.

Obviously the present invention is not limited to the precise construction and arrangement shown and described, as the same may be variously modified. Moreover, all the features of the invention need not be used conjointly as the same may be used to advantage in variously different combinations and sub-combinations.

Having thus described my invention, it is obvious that various immaterial modifications may be made in the same without departing from the spirit of my invention; hence, I do not wish to be understood as limiting myself to the exact form, construction, arrangement, and combina- tion of parts herein shown and described or uses mentioned.

What I claim as new and desire to secure by Letters Patent is:

1. In a device of the class described, the combination of an internal expanding brake shoe having a plurality of laterally spaced contact members adjacent one end thereof, and brake expanding means operatively related to one end portion of said shoe and having a plurality of laterally spaced contacts operatively related to the spaced contact members adjacent the opposite end of the shoe for maintaining said portions and the body of the shoe in substantial alignment.

2. In a device of the class described, the combination of a brake shoe having a bracket and spaced flanges associated therewith, and brake expanding means positioned between the end portions of said shoe and having three points of suspension widely spaced from each other and operatively related to said bracket and engageable with said flanges for maintaining said portions and body of the shoe in substantial alignment.

3. In a device of the class described, the combination of an internal expanding brake shoe having flanges formed thereon adjacent its edge portions, a bracket secured to one end portion of said shoe, and brake expanding means operatively related to said bracket and having spaced means engageable with said flanges for retaining the end portions and body of said shoe in substantial alignment.

4. In a device of the class described, the combination of a brake shoe of substantially U-shaped cross section, having flanges at opposite sides thereof, a bracket having a socket formed therein secured to one end portion of said shoe, and brake expanding means having a portion engageable with said socket and having a plurality of means engageable with said flanges at the opposite end portion of said shoe for retaining the end portions and body of said shoe in substantial alignment.

5. In a device of the class described, the combination of a brake shoe having flanges formed thereon, a bracket having a cup-like socket formed therein secured to one end portion of said shoe, and brake expanding means having a ball-like portion at one end thereof engageable with said socket and having a plurality of means on its opposite end engageable with said flanges at the adjacent end portion of said shoe for retaining the end portions and body of said shoe in substantial alignment.

6. In a device of the class described, the combination of an internal expanding brake shoe having spaced flanges formed thereon and extending substantially throughout the length thereof, said flanges increasing substantially uniformly in width from adjacent one of their end portions toward the opposite end thereof, a relatively stationary anchor operatively connected to one end of said shoe, and brake expanding means operatively related to said shoe by a single point of engagement at one end thereof and engageable with said flanges at the opposite end of the shoe in a manner to retain the ends and body of the shoe in substantial alignment.

7. In a device of the class described, the combination of an internal expanding brake shoe having spaced flanges formed thereon, and brake expanding means positioned between the ends of said shoe and operatively related to one end thereof and having a plurality of spaced contact portions engageable with said flanges at the opposite end of the shoe for maintaining the ends and body portion of the shoe in substantial alignment.

8. In a device of the class described, the combination of an internal expanding brake shoe having a plurality of laterally spaced contact members, and brake expanding means having one of its end portions operatively related to one end of said shoe by a single point of engagement and having a laterally extending cross-head adjacent its opposite end portion, the respective ends of said cross-head being engageable with the spaced members on the shoe for maintaining the ends and body portion of the shoe in substantial alignment.

9. In a device of the class described, the combination of a brake shoe, a relatively stationary anchor operatively connected to one end of said shoe, a pair of laterally spaced contact members mounted on the anchored end of the shoe, fluid operated brake expanding means having a chamber formed therein and having one of its end portions operatively related to one end of said shoe by a single point of engagement, a cross-head operatively related to the opposite end of said brake expanding means and having a passage formed therein communicating with said chamber, and means adjacent the opposite ends of said cross-head and engageable with said laterally spaced contact members for maintaining the ends and body portion of said shoe in substantial alignment.

JOHN W. TATTER.